United States Patent
Browning et al.

(10) Patent No.: US 11,503,772 B2
(45) Date of Patent: Nov. 22, 2022

(54) BALE FEED OUT APPARATUS

(71) Applicant: WESSEX INTERNATIONAL MACHINERY, Hampshire (GB)

(72) Inventors: Charles Browning, Hampshire (GB); Paul Wills, Hampshire (GB); Roy Wolfenden, Hampshire (GB)

(73) Assignee: WESSEX INTERNATIONAL MACHINERY, Hampshire (GB)

( * ) Notice: Subject to any disclaimer, the term of this patent is extended or adjusted under 35 U.S.C. 154(b) by 675 days.

(21) Appl. No.: 16/472,806

(22) PCT Filed: Dec. 20, 2017

(86) PCT No.: PCT/GB2017/053830
§ 371 (c)(1),
(2) Date: Jun. 21, 2019

(87) PCT Pub. No.: WO2018/115862
PCT Pub. Date: Jun. 28, 2018

(65) Prior Publication Data
US 2020/0084973 A1 Mar. 19, 2020

(30) Foreign Application Priority Data
Dec. 22, 2016 (GB) .................................. 1622059

(51) Int. Cl.
*A01F 29/10* (2006.01)
*A01F 29/00* (2006.01)
(Continued)

(52) U.S. Cl.
CPC ............ *A01F 29/10* (2013.01); *A01F 29/005* (2013.01); *A01F 29/04* (2013.01); *A01F 29/12* (2013.01)

(58) Field of Classification Search
CPC .......... A01F 29/10; A01F 29/01; A01F 29/04; A01F 29/12; A01F 29/00; A01F 29/005; A01D 2087/128
See application file for complete search history.

(56) References Cited

U.S. PATENT DOCUMENTS 3,552,463 A * 1/1971 Witt ........................ A01F 11/06
241/222
4,195,958 A * 4/1980 Vahlkamp .............. A01K 5/005
414/812
(Continued)

FOREIGN PATENT DOCUMENTS

DE 2715269 A1 10/1978
DE 3337390 C1 5/1985
(Continued)

*Primary Examiner* — Adam J Eiseman
*Assistant Examiner* — Bobby Yeonjin Kim
(74) *Attorney, Agent, or Firm* — Hunton Andrews Kurth LLP

(57) ABSTRACT

A forage bale feed out apparatus is described. The apparatus comprises a chassis arranged to be operatively mounted on or in association with a vehicle in use; feed out means comprising a feed out roller having an axis of rotational symmetry about which the roller is arranged to rotate, a drive motor arranged to rotate the feed out roller, conveying means for urging a bale towards said feed out roller as the size of a bale diminishes. The feed out roller is located at a feed out region, and the conveying means is orientated such that the end of the conveying means proximate the feed out region is elevated towards the axis of rotational symmetry of the feed out roller. The apparatus further comprises a spreader tool adapted to spread and distribute the forage bale portions fed out from the feed roller at the feed out region, wherein the spreader comprises a roller having an axis of rotational symmetry about which the roller is arranged to rotate. The spreader roller has radially extending tines at (Continued)

intervals which tines co operate in use to spread feed from a bale, and further comprising a spreader drive motor arranged to rotate the spreader roller, wherein the feed out roller and the spreader roller are parallel and driven in opposite directions.

15 Claims, 6 Drawing Sheets

(51) Int. Cl.
 *A01F 29/04* (2006.01)
 *A01F 29/12* (2006.01)

(56) References Cited

U.S. PATENT DOCUMENTS

| | | | | |
|---|---|---|---|---|
| 4,266,899 A | * | 5/1981 | Skeem | A01F 29/005 241/101.76 |
| 4,443,146 A | * | 4/1984 | Duncan | A01F 29/005 414/24.6 |
| 4,778,322 A | * | 10/1988 | Stronski | A01F 29/005 414/24.6 |
| 5,865,589 A | * | 2/1999 | Reyher | B01F 33/502 414/412 |
| 2005/0220572 A1 | * | 10/2005 | Roosma | A01D 87/122 414/24.6 |
| 2006/0175445 A1 | * | 8/2006 | Hoovestol | A01K 5/005 241/101.74 |
| 2007/0138328 A1 | * | 6/2007 | Hoovestol | A01F 29/005 241/189.1 |
| 2013/0193247 A1 | * | 8/2013 | Graham | A01F 29/00 241/280 |
| 2015/0069158 A1 | * | 3/2015 | Graham | A01K 5/005 241/101.5 |

FOREIGN PATENT DOCUMENTS

| | | | |
|---|---|---|---|
| FR | 2561490 A1 | 9/1985 | |
| FR | 2759537 A1 | 8/1998 | |
| GB | 2048211 A | * 12/1980 | ........... A01D 87/127 |
| GB | 2048211 A | 12/1980 | |
| GB | 2158111 A | 11/1985 | |
| NZ | 286932 A | 9/1998 | |
| WO | 9403043 A1 | 2/1994 | |

* cited by examiner

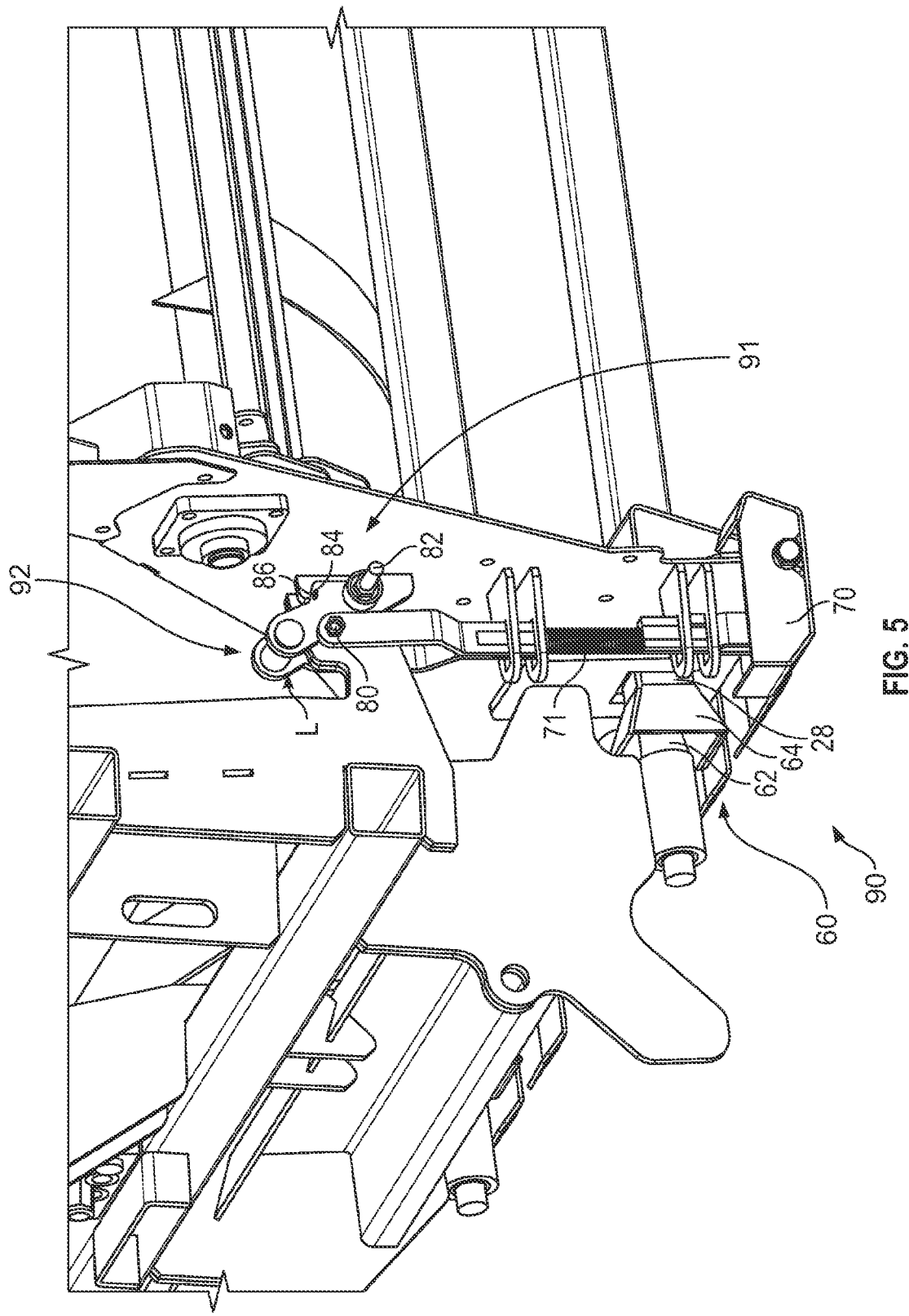

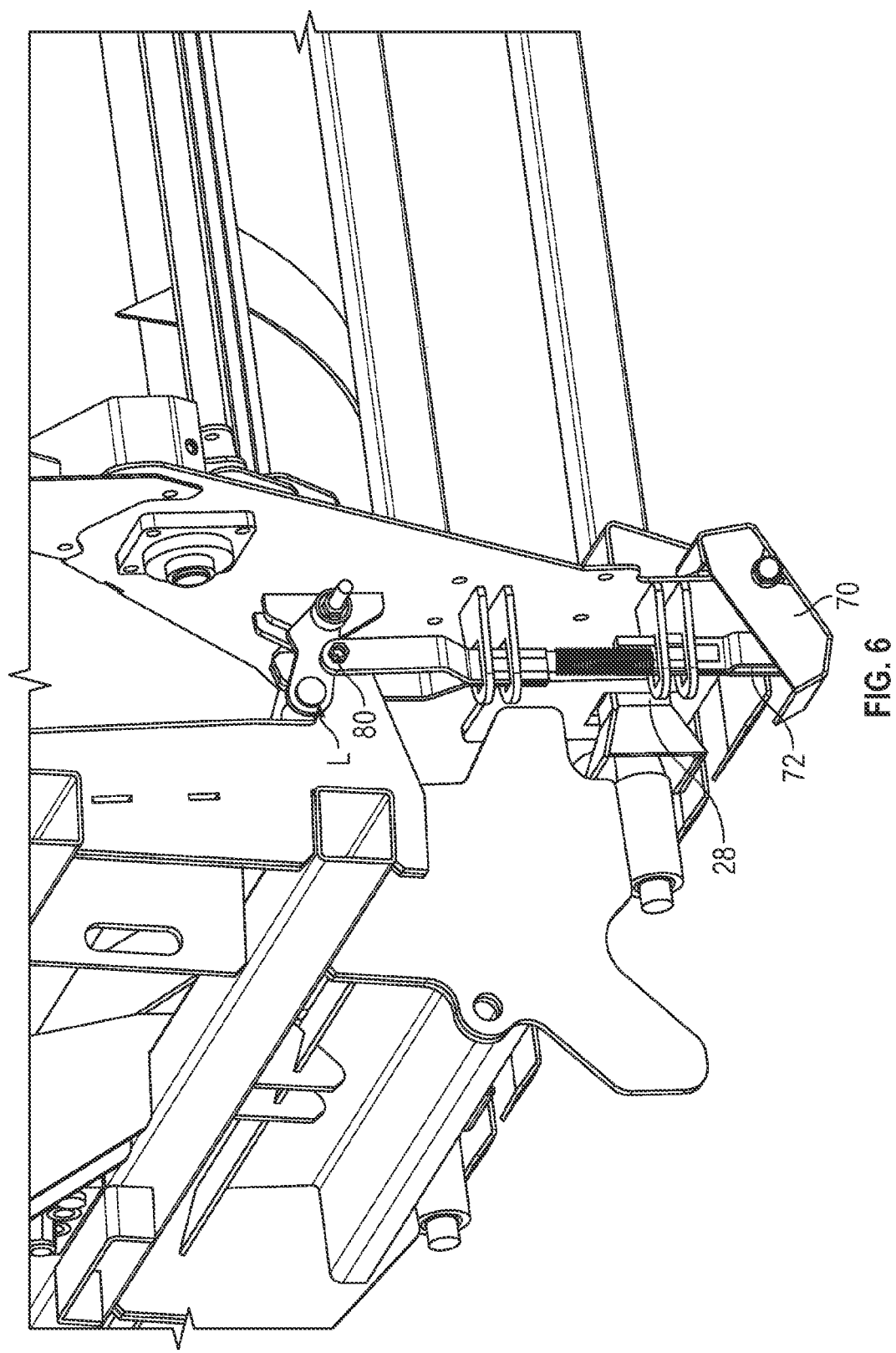

BALE FEED OUT APPARATUS

CROSS-REFERENCE TO RELATED APPLICATIONS

This application is a national phase application based on International Patent Application No. PCT/GB/2017/053830 filed Dec. 20, 2017, claiming priority to United Kingdom Patent Application No. 1622059.2 filed Dec. 22, 2016, the entire contents of which both are incorporated herein by reference.

TECHNICAL FIELD

The invention relates to bale feed out apparatus in particular to a hay bale or forage feed out apparatus for use in conjunction with or towed by a tractor.

BACKGROUND

There is an increasing tendency to harvest hay in large bales, and various devices have been produced to aid in feeding out a line of forage for stock from these bales. Ordinarily the apparatus is supported on or towed by a tractor and is arranged to support the bale with some mechanism to feed out the hay from the bale as a line of loose hay suitable for consumption by stock. The forage can become stuck in the feed out device. In addition it can be difficult to feed out the end of the bale. The spread and broadcast of the forage for stock has thus far been determined by the route the feed out device is taken by the towing vehicle such as the tractor. It is desirable that apparatus that is provided to aid in feeding out a line of forage for stock from these harvested bales be relatively simple, robust and versatile.

An aspect of the invention provides a forage bale feed out apparatus comprising: a chassis arranged to be operatively mounted on or in association with a vehicle in use; feed out means comprising a feed out roller having an axis of rotational symmetry about which the roller is arranged to rotate, a drive motor arranged to rotate the feed out roller, conveying means for urging a bale towards said feed out roller as the size of a bale diminishes; the feed out roller is located at a feed out region, and wherein the conveying means is orientated such that the end of the conveying means proximate the feed out region is elevated towards the axis of rotational symmetry of the feed out roller, further comprising a spreader tool adapted to spread and distribute the forage bale portions fed out from the feed roller at the feed out region, wherein the spreader comprises a roller having an axis of rotational symmetry about which the roller is arranged to rotate, the spreader roller having radially extending tines at intervals which tines co operate in use to spread feed from a bale, and further comprising a spreader drive motor arranged to rotate the spreader roller, wherein the feed out roller and the spreader roller are parallel and driven in opposite directions.

By this arrangement of the exit point of the forage feed, the rotation of the feed out roller and rotation of the spreader roller in opposite directions a wider broadcast spread of the forage is achieved without increasing the distance of travel of the tractor or other vehicle. Without the spreader tool the forage would be deposited in a line from the feed out roller, the line running alongside the travel of the chassis mounted on the vehicle.

Preferably, the conveying means is a chain conveyor. Preferably the conveying means includes outwardly extending teeth at intervals therealong which teeth co operate in use to draw out feed from a bale. The chain conveyor can be substantially flat along a major portion of its length. This means the apparatus provides a low loading height for the bales to be spread, providing a stable, secure loading area and process.

In an embodiment the chain conveyor is arranged to elevate from a lowest point of the conveyor to a highest point, the highest point being located above the substantially flat portion of the conveyor, being above the location of the axes of rotational symmetry of each of the feed out rollers and being proximate the feed out region.

In an embodiment the chassis includes a lower section with engaging portions for enabling linkage to a vehicle, and the chassis may include a sub frame upon which the feed out roller is mounted and an under shield. In this way the apparatus can be towed by a tractor. In addition the under shield provides a catch portion for any element of the bale that become detached.

The chassis of an embodiment also includes a back frame for restricting rearward movement of a forage bale.

In the embodiment the conveying means for urging a bale towards the feed out region is mounted within a cradle for safety and security and for a compact apparatus. In a further preferred embodiment the cradle has a frame dimensioned to support a large round bale in use and to restrict the lateral movement of the bale such that the outer curved periphery of the bale is maintained in engagement with the feed out roller means. The components of the frame of the chassis provide advantageous safety features and can avoid the toppling out of the chassis of a particularly heavy or oversize bale. The frame would also secure the bale in the apparatus during extended movements of the tractor that may be pulling the apparatus and the bale, for example during turning manoeuvres or when on rough ground. In an alternative embodiment the apparatus is adapted to accept and operate a square bale, including appropriate support for the bale.

Preferably the tool a tool adapted to spread and distribute the forage bale portions fed out from the feed out rollers comprises a bolt on spreader accessory. In this way, the spreading of the forage for stock is aided by the spreader accessory. In particular, the feed out rollers and spreader roller are parallel and driven in the opposite direction, in this way the forage to be spread has the maximum wrap and contact with the roller resulting in the maximum throw and most effective and widespread distribution across the ground. In particular, it may be arranged that the drive transmission includes a dog clutch with a centrally locating engagement pin and cone system.

There may be a forage bale feed out apparatus as previously mentioned and further comprising a latch mechanism arranged to connect the tool to the feed out apparatus, the connection and latching portion providing a rising feature such that the spreader roller tines are urged into engagement and into a predetermined alignment before the latch mechanism is latched in and completed. This is advantageous in that the headstock or rotating roller can be positioned and secured in the correct manner and in the correct orientation with respect to the rest of the machinery before fully latching and starting the feed out and spreading operation.

A foot portion may be provided on the bale feed out apparatus, in particular the foot portion may include a sprung element providing a degree of shock absorbency, so as to prevent damage to the component parts of the apparatus and/or the tool from rough handling onto the ground. This means that the cushioned part of the apparatus or sprung foot portion can prevent damage to the machine apparatus parts if the tool or the feed out apparatus is dropped from a tractor or otherwise dumped or roughly handled onto the ground before the headstock rollers are ready to be released and brought into operation.

One preferred form of the invention will now be described with reference to the accompanying drawings, in which:

BRIEF DESCRIPTION OF THE DRAWINGS

FIG. 1 shows the apparatus including the support frame for operatively engaging the apparatus on the tractor;

FIG. 5 is a close up perspective view of the foot portion and latch of the chassis of the apparatus of FIG. 1, with the latch in an open position; and FIG. 6 is a is a close up perspective view of the foot portion and latch of the chassis of the apparatus of FIG. 1, with the latch in a closed position and with the foot in an extended, open position.

DETAILED DESCRIPTION

Figure 1:
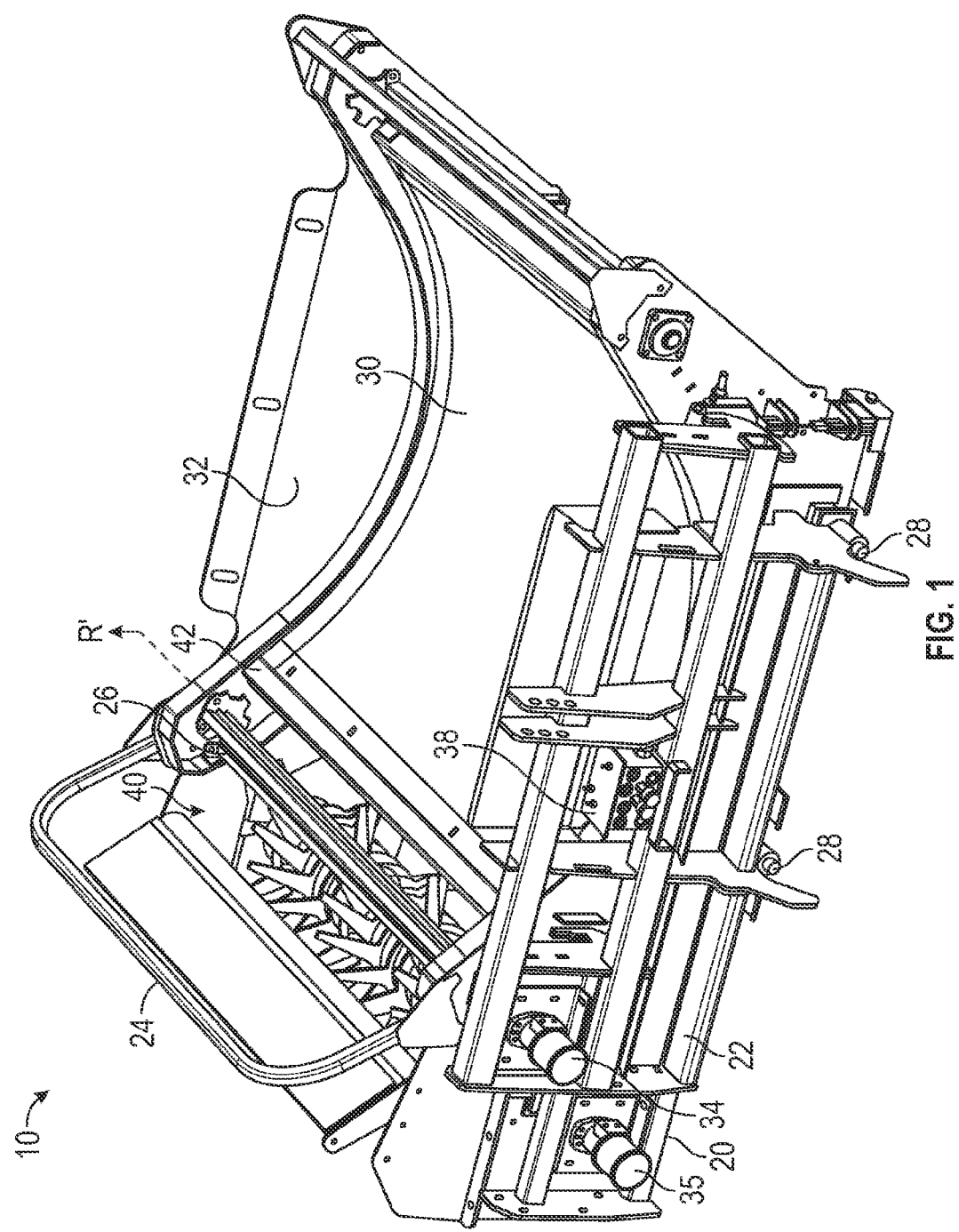
FIG. 1 is a perspective overhead view of the feed out apparatus according to the present invention.

The present invention comprises forage feed out apparatus to support a large round hay bale which apparatus when operatively mounted on a tractor allows hay from the bale to be feed out in a line of loose hay for stock. In addition the invention includes a tool adapted to spread and distribute the hay or forage fed out from the feed out portion of the apparatus.

With reference to FIGS. 1, 2, 3 and 4, there is provided feed out apparatus 10, comprising a chassis 20. The feed out means comprises a feed out roller 26. The roller 26 having an axis of rotational symmetry R' about which the roller is arranged to rotate. The feed out roller is connected to a drive motor 34. The drive motor 34 is mounted to the chassis 20 and is arranged to rotate the feed out roller 26. The apparatus further comprises a conveying means 42 for urging a bale B towards said feed out roller 26 as the size of a bale diminishes. The apparatus is arranged such that the feed out roller 26 is located at a feed out region 40, and wherein the conveying means 42 is orientated such that the end of the conveying means 42 proximate the feed out region 40 is elevated towards axis of rotational symmetry of the feed out roller R'.

The apparatus includes a spreader tool T adapted to spread and distribute the forage bale portions fed out from the feed roller 26 at the feed out region 40. The tool T comprises a roller 50 having an axis of rotational symmetry about which the roller 50 is arranged to rotate, the spreader roller having radially extending tines at intervals which tines co operate in use to spread feed from a bale B. There is also a spreader drive motor arranged to rotate the spreader roller 50, wherein the feed out roller 26 and the spreader roller 50 are parallel and driven in opposite directions.

Figure 2:
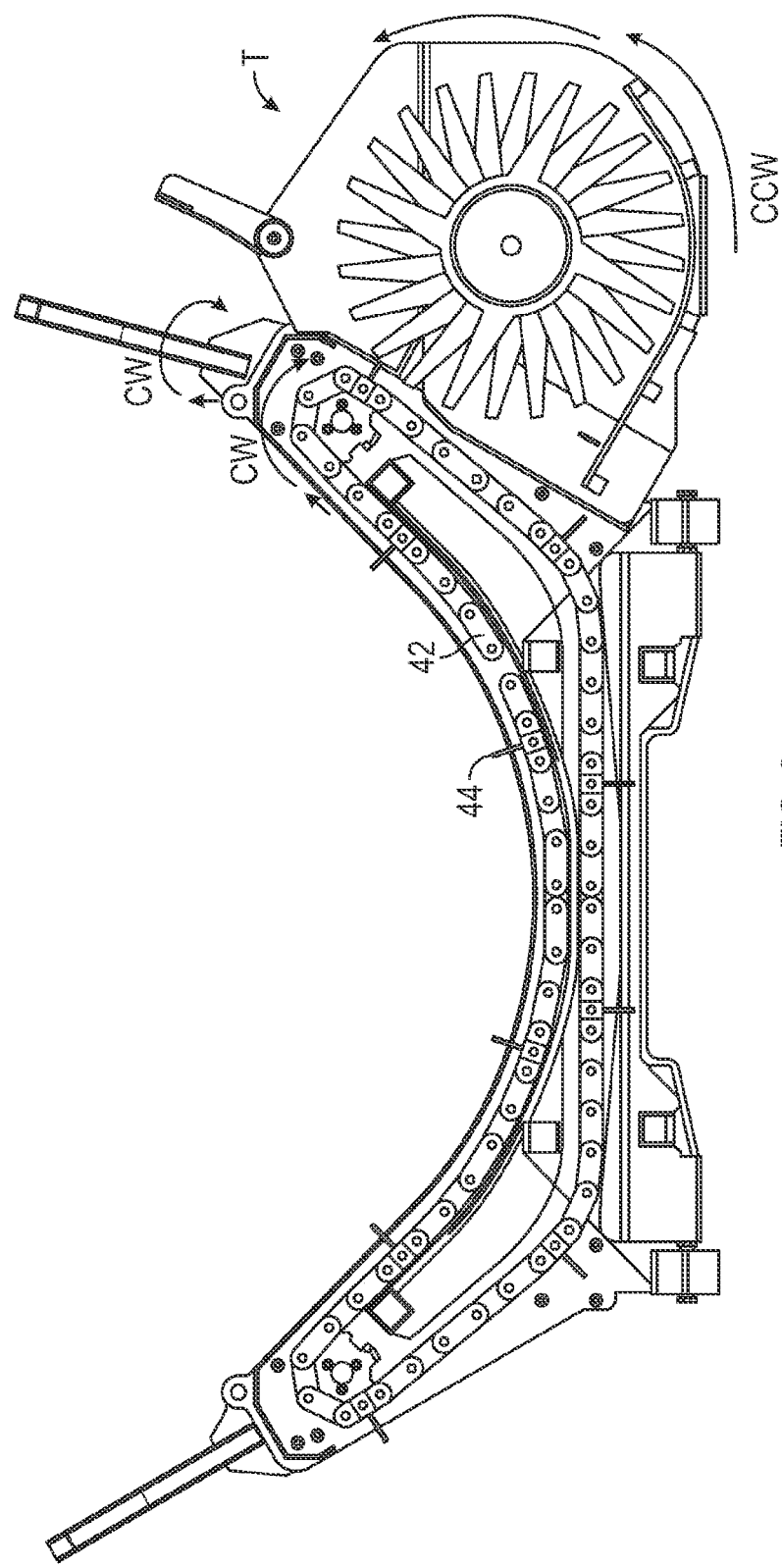
FIG. 2 is a cross sectional view pf the apparatus of FIG. 1 when viewed from the rear.
Figure 3:
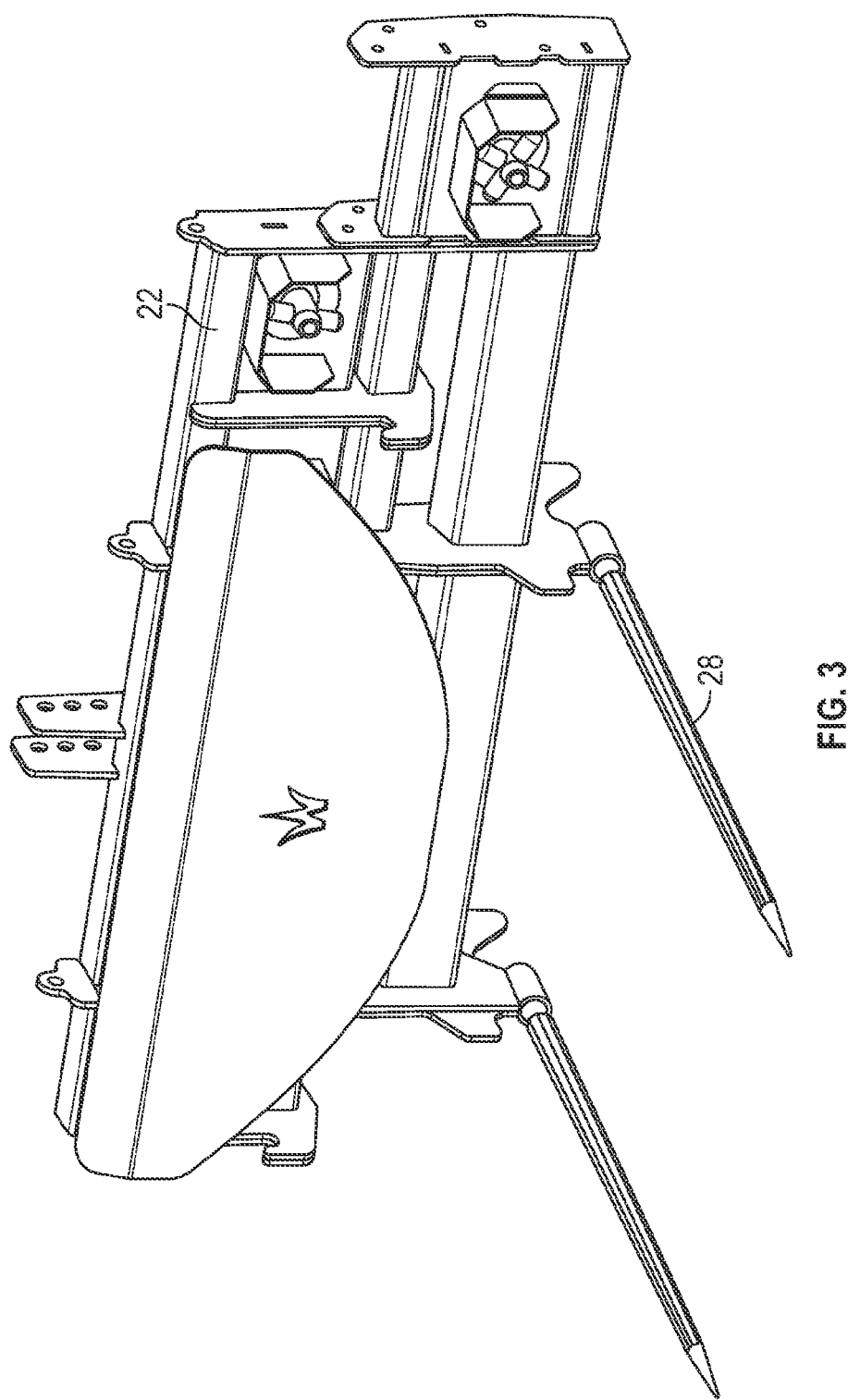
FIG. 3 is a perspective front view of the forks and support frame of FIG. 1 for operatively engaging the apparatus on a vehicle or tractor.

Turning to FIG. 1 and FIG. 2 to describe the apparatus in further detail. The feed out apparatus 10 as illustrated in FIG. 1, may be stably supported on the ground ready to receive a large round bale B. A chassis 20 fabricated from suitable hollow box members provides such a stable support and incorporates sockets to be engaged by prongs 28 of a tractor mounted support frame 22 so that the chassis can be elevated and supported, for example from a three point linkage assembly of a tractor.

Extending outwardly towards one side of the chassis is a sub frame 24 which provides mounting for a feed out roller 26. The feed out rollers are arranged to be driven through a transmission means which forms part of a drive (not shown) driven by motor 34.

Securely mounted to the chassis 20 and extending in the opposite direction to the roller supporting frame 24 is a cradle 30. In use the cradle 30 supports a bale B in association with the feed out rollers 26 and 28. A back frame 32 restricts rearward movement of the bale B.

The chassis 20 allows the apparatus to be stably supported on the ground as illustrated in FIG. 1 and the prongs 28 will also allow an operator from the tractor to move a bale B from its stored position and lift the bale B into the cradle 30. This means that in use a bale B can be lifted by the prongs or forks 28 of a tractor mounted support frame 22 into the cradle 30 when the cradle is in such a ground position as shown in FIG. 1. The tractor mounted support frame 22 can then be retracted and the prongs 28 can by this action be removed from the bale once it is in place ready to act with the support frame 22 to support the chassis 20. In particular, the apparatus 10 is supportable on a three point linkage of a tractor (not shown) and the frame 22 has projecting from the lower corners thereof two parallel arms or prongs 28 arranged in use to engage in the engaging sockets in the apparatus and to provide a stable support for the chassis 20 in operative engagement with the support frame 22. Further details of the engagement of the prongs 28 with the chassis are described below with reference to FIGS. 5 and 6.

The frame 22 also has supported thereon a hydraulic motor 38 which is part of the control means to provide the power from the tractor or other vehicle to the frame and prongs 28 in order to assist with the latching function and operation.

The conveying means 42 is shown in FIG. 2 is a chain conveyor and includes outwardly extending teeth or bars 44 at intervals therealong which bars or teeth co operate in use to draw out feed from a bale B and to draw the bale along the conveyor and to cause it to rotate. The bars 44 may include upstanding teeth. The bars may be equally spaced along the conveying means 42, for example there are 10 bars on the chain conveyor illustrated in FIG. 2. The feed out roller 26 is driven in the same direction as the conveyor 42. The feed out roller 26 can have radially extending teeth 36 with the teeth on the roller being operatively associated to facilitate removal of hay from the bale B and also to act as a clearing means to ensure there is a minimum likelihood of hay becoming entangled on the feed out roller or in the fed out region 40. For example, there are at least three sets of these interacting teeth along the rollers but as will be appreciated this number could be varied.

Figure 4:
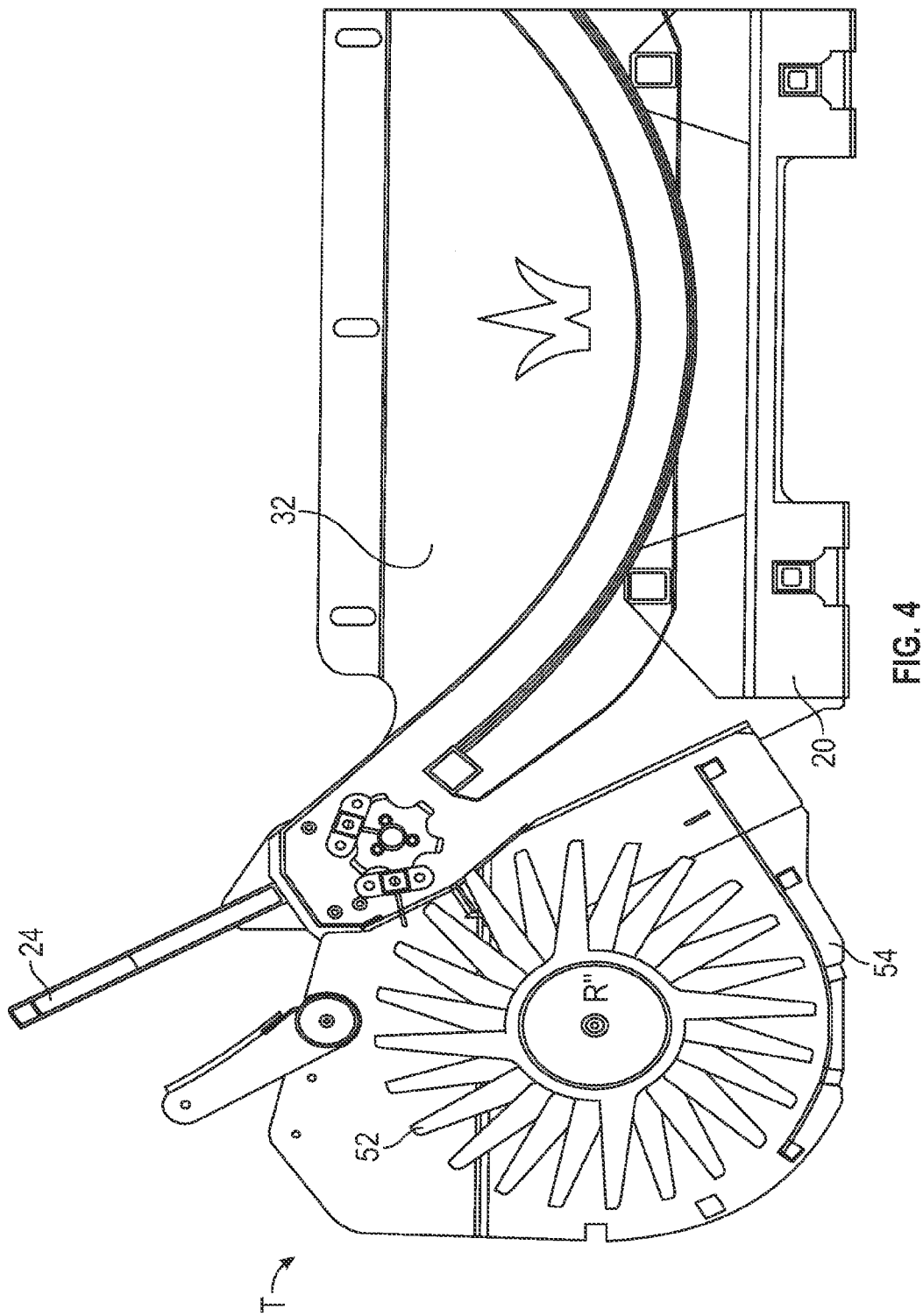
FIG. 4 is a cross sectional view, of the apparatus shown in FIGS. 1 and 2, showing the spreader accessory in more detail.

With reference to FIG. 4, and as also shown in FIG. 2, a bolt on tool or spreader accessory, T, is shown. The spreader is arranged to distribute the forage bale portions fed out from the feed out rollers. The spreader tool T comprises a roller 50, having an axis of rotational symmetry R" about which the roller is arranged to rotate, the spreader roller having radially extending tines 52 at intervals spirally therealong which tines co operate in use to spread feed from a bale, and further comprising a drive motor 35 arranged to rotate the spreader roller. The roller 50, is located above a portion of the chassis 20 including an under shield 54. In the arrangement shown in FIG. 4 the tines 52 are swept back in order to urge the forage from the bale B to drop off, be released from the tines and directed towards the shield 54. When viewed from the rear as shown in FIG. 2, the rotation of the feed out roller is clockwise (CW) and the rotation of the spreader roller is counter clockwise (CCW) so as to create the maximum throw of the forage from the spreader with the minimum opportunity for clogging and residency time of the forage at the spreader tool and in the feed out region.

There is a latch mechanism arranged to connect the tool T to the feed out apparatus, as shown in FIGS. 5 and 6. The connection and latching portion are arranged to provide a rising feature such that the spreader roller tines are urged into engagement and into a predetermined alignment before the latch mechanism is latched in.

The rollers 26 and 50 must be driven by a suitably powered drive means to ensure that the hay can be removed or loosened by the teeth on the chain conveyor 42, by the roller 26 and by the spreader roller 50 and thus feed out from the bale B, without tangling a supply of hay from the bale B to deliver loose hay to a line of stock formed.

The motor 34 mounted on the frame 22 and motor 35 are arranged to be automatically engaged by the transmission means associated with the rollers.

It is desirable to ensure that the transmission allows for a sufficient reduction in gearing to provide appropriate power to the conveying means 42 and to rollers 26 and 50. By way of example the transmission has dog clutch and a coupling with the drive shaft that engage with a coupling drive engagement on the hydraulic motors. The dog clutch 60 comprises a central locking engagement pin and a cone.

Turning now to FIGS. 5 and 6, the latch mechanism between the support frame 22 and the chassis 20 will now be described. In operation when the headstock of the frame 22 is lifted the weight and load of the chassis (and associated bale B) is loaded onto the latch L. The latch L hook and bar are shown in unlatched in FIG. 5, for example when the chassis is located on the ground, and in a latched position with the hook and bar connected in FIG. 6. The latch is operated via a bolt 80 and pivot pin 82. A torsion spring (not shown) is held at screw points 84, 86 and the chassis 20 further includes a foot portion 70. The foot portion 70 acts via the spring 71 and sprung element 72 to hold the bar and latch out of engagement when the chassis supported on the ground and then to release and urge the hook into latch engagement once the headstock and support frame are engaged via the prongs 28 an engagement cone 64. The spring in effect takes the pressure of the latch hook when it is disengaged from the bar and urges and maintains the latch while the weight and load of the chassis and bale is with the support frame.

The apparatus provides a degree of shock absorbency, so as to prevent damage to the component parts of the apparatus and/or the tool T from rough handling and rough landing or positioning on rough or uneven ground.

As described above in use the chassis 20 is supported on a stable base and a bale B loaded therein preferably using the prongs or forks 28 on the frame 22. Once the bale is in position the prongs are engaged with the chassis 20 and the chassis lifted into position so that the roller transmission for rollers 26 and 50 couples with the motors 34 for the rollers. There can be means also operatively connected to provide the operator with a means of raising the cradle 30 relative to the feed out roller 26. A pressure sensitive control could be used to automatically regulate the appropriate positioning of this cradle to ensure that the bale B is retained in the correct position relative to the feed out roller 26 and spreader roller 50.

When it is desired to feed out hay then drive power through the motors is provided to the rollers 26 and 28 and the conveyor 42. The rotation of the rollers causes the protruding teeth 36 to tear hay from the bale B and feed loose hay in a line into the spreader attachment area, in particular the feed out region 42. The feed enters the spreading attachment within the 12 o'clock to 3 o'clock quadrant, preferably 12 o'clock to 1 o'clock. This ensures that the hay has the maximum contact area with the spreader roller 50 and the distribution of hay over the ground is maximised as the unit remains stationary or as the unit is moved over ground, towed by a tractor or other vehicle. The positioning means ensures that the bale is maintained in operative association with the feed out roller 26. The gearing provided through the transmission ensures that there is adequate power delivered to the feed out roller and spread roller.

The unit is robust simple in operation and versatile. The cradle 30 illustrated is particularly adapted for a round bale but a modified cradle or a cradle with adjusting components could be set up so that either a round or a rectangular or square bale could be used in the apparatus. In addition the tines on the spreader roller may be altered or adapted in shape for particular spreading functions. Also the feed out roller or rollers could be provided at either side or orientation on the cradle.

The apparatus is particularly designed for the feed out mechanism as illustrated using the inter-engaging teeth on two associated rollers. However, the arrangement of the cradle and chassis could be used in association with other feed out means. Also while there are significant advantages in providing a unit which can allow separation from the cradle and its supporting chassis from the mounting frame it will also be feasible to provide a unit where the cradle was permanently located in association with the vehicle. Similarly, it is possible to provide a detachable tool T or this can be permanently attached to the apparatus.

What is claimed is:

1. A forage bale feed out apparatus comprising:
a chassis arranged to be operatively mounted on or in association with a vehicle in use;
feed out means comprising a feed out roller having an axis of rotational symmetry about which the roller is arranged to rotate, a drive motor arranged to rotate the feed out roller, conveying means for urging a bale towards said feed out roller as the size of a bale diminishes;
the feed out roller is located at a feed out region, and wherein the conveying means is orientated such that the end of the conveying means proximate the feed out region is elevated towards the axis of rotational symmetry of the feed out roller, further comprising a spreader tool adapted to spread and distribute the forage bale portions fed out from the feed roller at the feed out region,
wherein the spreader comprises a roller having an axis of rotational symmetry about which the roller is arranged to rotate, the spreader roller having radially extending tines at intervals which tines co-operate in use to spread feed from a bale, and further comprising a spreader drive motor arranged to rotate the spreader roller, wherein the feed out roller and the spreader roller are parallel and driven in opposite directions; wherein the conveying means is a chain conveyor and the chain conveyor is arranged to elevate from a lowest point of the conveyor to a highest point, the highest point being located above the substantially flat portion of the conveyor, being above the location of the axes of rotational symmetry of each of the feed out rollers and being proximate the feed out region.

2. The forage bale feed out apparatus as claimed in claim 1, the conveying means including outwardly extending teeth at intervals therealong which teeth co-operate in use to draw out feed from a bale.

3. The forage bale feed out apparatus as claimed in claim 1, wherein the chain conveyor is substantially flat along a major portion of its length.

4. The forage bale feed out apparatus as claimed in claim 1, wherein the chassis includes a lower section with engaging portions for enabling linkage to a vehicle.

5. The forage bale feed out apparatus as claimed in claim 1, wherein the chassis includes a sub frame upon which the feed out roller is mounted and an under shield.

6. The forage bale feed out apparatus as claimed in claim 1, wherein the chassis includes a back frame for restricting rearward movement of a forage bale.

7. The forage bale feed out apparatus as claimed in claim 1, wherein the conveying means for urging a bale is mounted within a cradle mounted on the chassis.

8. The forage bale feed out apparatus as claimed in claim 5, wherein the cradle has a frame dimensioned to support a large round bale in use and to restrict the lateral movement of the bale such that the outer curved periphery of the bale is maintained in engagement with the feed out roller means.

9. The forage bale feed out apparatus as claimed in claim 1, wherein the spreader tool comprises a bolt on spreader accessory.

10. The forage bale feed out apparatus as claimed in claim 1, wherein the feed out rollers and spreader roller are parallel and driven in the opposite direction, maximum wrap and maximum throw.

11. The forage bale feed out apparatus as claimed in claim 1, wherein the apparatus comprises a drive transmission includes including a dog clutch with a centrally locating engagement pin and cone system.

12. The forage bale feed out apparatus as claimed in claim 6, further comprising a latch mechanism arranged to connect the tool to the feed out apparatus, the connection and latching portion providing a rising feature such that the spreader roller tines are urged into engagement and into a predetermined alignment before the latch mechanism is latched in and completed.

13. The forage bale feed out apparatus as claimed in claim 1, wherein the chassis further comprises a foot portion.

14. The forage bale feed out apparatus as claimed in claim 11, wherein the foot portion includes a sprung element providing a degree of shock absorbency, so as to prevent damage to the component parts of the apparatus and/or tool from rough handling onto the ground.

15. The forage bale feed out apparatus as claimed in claim 1, wherein the apparatus is adapted to accept and operate with round or square bales.

* * * * *